United States Patent
Morgan

[15] 3,648,894
[45] Mar. 14, 1972

[54] FLUID DELIVERY SYSTEM
[72] Inventor: Alan George Morgan, Bromley, England
[73] Assignee: The British Petroleum Company Limited, London, England
[22] Filed: May 1, 1969
[21] Appl. No.: 820,802

[30] Foreign Application Priority Data
June 7, 1968    Great Britain.....................27,149/68

[52] U.S. Cl...............................222/74, 137/219, 141/225, 222/504
[51] Int. Cl.......................................................B67d 5/373
[58] Field of Search....................137/219; 141/41, 198, 206, 141/214, 215, 224, 227, 279; 222/73, 571, 504, 74, 75

[56] References Cited
UNITED STATES PATENTS

| | | | |
|---|---|---|---|
| 1,957,398 | 5/1934 | Wallace | 222/75 |
| 1,647,043 | 10/1927 | Hawxhurst | 222/73 |
| 2,138,380 | 11/1938 | Killman et al. | 141/215 |
| 3,102,555 | 9/1963 | Botkin | 141/225 X |
| 3,251,507 | 5/1966 | Murray | 141/225 X |
| 3,335,746 | 8/1967 | Lebow | 137/219 X |

*Primary Examiner*—Edward J. Earls
*Attorney*—Morgan, Finnegan, Durham and Pine

[57] ABSTRACT

A fluid delivery system, such as a petrol pump, wherein there is a flexible hose between the pump and meter and the hosecock, has its main shut-off valve placed between the pump and the hose, a nonreturn pressure-relief valve near the hose end remote from the pump and shut-off valve, and a switch mechanism contained in the hosecock for operating the shut-off valve. Hence, whenever the flow is shut off only the back pressure of the nonreturn valve is felt within the hose, thus permitting the use of light hose and making handling easier. Desirably, the hosecock is provided also with an automatic cutoff or overfill prevention device operative to close the main shut-off valve when the end of the hosecock dips into the fluid.

1 Claims, 2 Drawing Figures

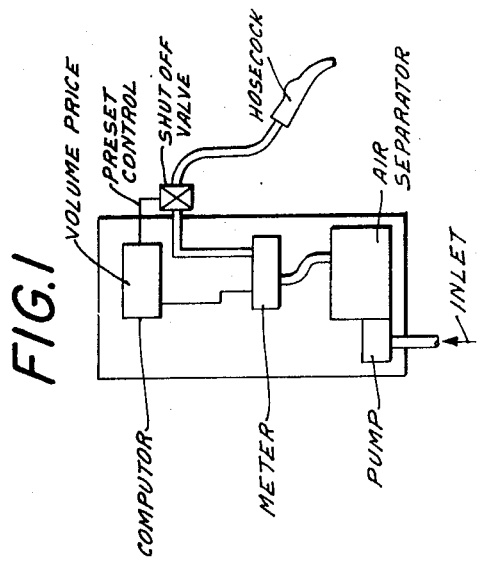
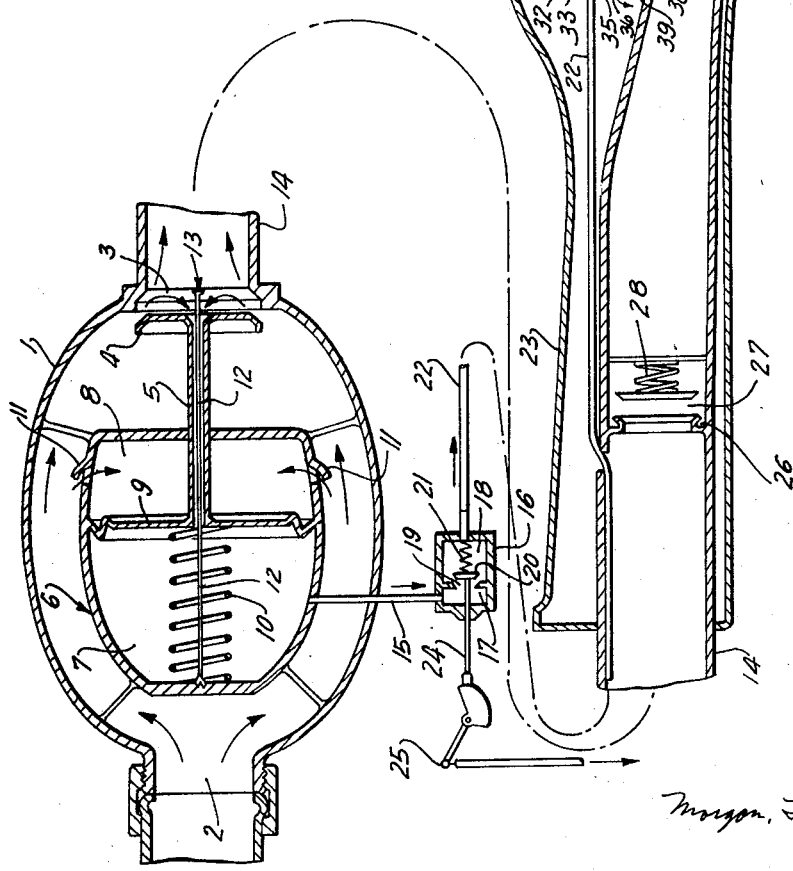

FLUID DELIVERY SYSTEM

The present invention relates to a fluid delivery system.

In metered fluid delivery systems, particularly petrol pumps, where there is a flexible hose between the pump and meter and the hosecock there is a real handling problem. This hose must be fairly rigid as it forms part of the delivered measure and changes of volume with changing pump pressure greater than the permitted tolerances could take place if it were much more flexible. It is this rigidity which causes most difficulty in handling and it is one object of this invention to overcome it.

When the liquid is shut off manually at the hosecock in a pump of this sort the hose takes the full pump pressure, whereas when a preset valve is used for final shut off the hose is only subjected to the slight back pressure of the non return valve mounted in it to keep it full. This difference can be quite considerable and any dilation in the hose will cause an error of measurement.

The present invention overcomes these difficulties by placing the hosecock valve between the pump and the hose so that whenever the flow is shut-off only the back pressure of the nonreturn valve is felt within the hose. This permits the use of light hose and makes handling easier.

Thus, according to one feature of the present invention there is provided a fluid delivery system comprising a pump connected to a shut off valve which is in turn connected by a flexible hose, containing a nonreturn valve near the end remote from the pump and shut-off valve, to a nozzle on which nozzle is mounted means for operating the shut-off valve.

Any fluid may be used but the system is particularly suited to filling a motor vehicle.

As the shut off valve of this invention is connected between the pump and flexible hose a separate preset valve is not necessary to deliver a measured quantity of fluid. A mechanical, electric, electromagnetic, pneumatic, hydraulic or other linkage can be used to connect the valve to a presetting device.

Any of the linkages singly or in combination: mechanical, electric, electromagnetic, pneumatic or hydraulic may also be used to link the hosecock switch with the shut off valve. Preferably the linkage is hydraulic.

To prevent over-filling of the tank it is desirable to have an automatic cutt-off device mounted on the hosecock cock to close the main shut off valve when the end of the hosecock dips into the fluid.

Thus according to another feature of the present invention there is provided an over-fill prevention device which comprises an air bleed line leading from the outside surface of the hosecock nozzle, close to the discharge orifice, to one side of a diaphragm chamber, another air bleed line leads from the same side of the diaphragm chamber to the interior of the hose or hosecock.

Thus when the end of the nozzle dips into fluid covering the end of the air bleed line the suction caused by fluid flowing past the other end of the line deflects the diaphragm which may be suitably linked to the shut-off valve.

The invention is illustrated by FIG. 1 and 2 of the accompanying drawings of which FIG. 1 is a diagram of a fuel delivery system according to this invention and FIG. 2 shows a section partly diagrammatic, through the shut-off valve and hosecock.

With reference to FIG. 2 the shut off valve comprises an ovoidal valve body 1 with an open inlet 2 at one end and an outlet 3 at the other end closed by a mushroom main valve member 4. The mushroom valve (4) has a hollow stem 5 whose downstream end communicates with the outlet (3), and whose upstream end communicates, with the interior of an oblately ovoid chamber 6 mounted inside the valve body 1. The chamber 6 is divided into two smaller chambers 7 and 8 by a diaphragm 9 attached round and supporting the end of the hollow stem 5 and biased towards the downstream small chamber 8 by a coil spring 10. The downstream small chamber 8 is connected with the interior of the valve body 1 by vents 11. Down the inside of the hollow stem 5 but not touching its walls passes a stem 12 one end of which is rigidly fastened to the upstream end of the internal chamber 6. The other end carries a small poppet valve 13, large enough to close the hole through valve 4 by which the hollow stem 5 communicates with the main outlet 3 and hose 14. From the upstream small chamber 7, a narrow tube 15 leads outside the valve body 1 to a small valve 16. This valve comprises a body divided into two chambers 17 and 18 with a passage 19 between them which can be sealed by a poppet valve 20 having a stem 24. The tube 15 enters the chamber 17 upstream of the poppet valve 20 which is biased towards the upstream end of chamber 17 by coil spring 21 to start the passage 19. A tube 22 emerges from the chamber 18 at the downstream side of the poppet valve 20 and leads to the hosecock 23. The stem 24 of valve 20 traverses the passage 19, emerges from the upstream end of valve chamber 17 and is attached by a system of levers 25 comprises hosecock nozzle 47 connected to hose 14 and to a presetting device which is not shown.

The hosecock 23 for opening the poppet valve 20 against the action of spring 21, contains a non return pressure relief valve comprising an annular valve seat 26 which, as here preferably embodied is, mounted in the nozzle (47). A valve 27 is biased towards the upstream end of the nozzle onto this seat by a spring 28. The hosecock 23 also contains a switch mechanism comprising a push button 29 biased outwards by a spring 30. The lower side of the button is attached axially to the outer end of a rod 31 bearing a thin circular disc 32 mounted axially on the inner end. This disc bears on a sphere 33 which in turn rests on another disc 34 mounted axially on the outer end of a rod 35, which passes into the upstream chamber 36 of a valve body 60 and thence into the downstream chamber 36' through the opening 36'' and carries a poppet valve 37 on its inner end. The poppet valve 37 is biased upstream toward opening (36'') and shut by spring 38. The tube 22 from the valve 16 enters the upstream chamber 36 and another tube 39 emerges from the downstream chamber 36') and enters the hose nozzle 47 downstream of the nonreturn valve 27. From the sphere 33, a rod 40 extends at right angles to the rods 31 and 35 but in the same plane. This rod 40 is attached by a crank 41 to the outer end of another rod 42 which enters a diaphragm chamber 43. The end of the inner rod 42 is attached to diaphragm 44 which is biased outwardly along the axis of the rod by a coil spring 45 in the lower half of the diaphragm chamber. A tube 46 connects the lower half of the diaphragm chamber with the outer surface of the hosecock nozzle (47) near its open end by a vent (48). Another tube (49) connects the lower half of the diaphragm chamber with the interior of the hosecock nozzle (47) downstream of the nonreturn valve (27) at a point where the nozzle diameter is constricted to provide a venturi constriction (50).

Using this apparatus the valves are actuated hydraulically. While fluid is flowing through the hose and the main valve member 4 of the main shut off valve is open as in FIG. 2, a small quantity of fluid will leak through the hollow stem 5 of the main valve 4 into the internal chamber 7 and then out through tube 15 valve 16 tube 22 and valve 36 into the hosecock nozzle 47 by way of tube 39. While this flow is maintained the pressure in the chamber 7 to the rear of the diaphragm 9 in the shut-off valve is less than that in the chamber 8 on the valve side of the diaphragm and thus the main valve member 4 is held open against the spring 10. When the flow is cut off the pressure in the chamber 7 behind the diaphragm rises to equalize that in the chamber 8 on the main valve side of the diaphragm, which allows the valve spring 10 to act to move the diaphragm and the main valve 4 attached to it until the valve closes the outlet 3 to the hose 14. At the same time the small poppet valve 13 mounted on the stem 12 located in the hollow stem 5 of the main valve 4 closes the hole in the main valve.

The flow may be cut off either by operating the levers 25 from the preset device to release the poppet valve 20 and thus close the small valve 16 in the bleed line 15 from the small chamber 7 or by releasing the hosecock switch pushbutton 29 which allows the small poppet valve 37 in the bleed line 22 to close. If the end of the hosecock nozzle 47 dips into fluid sealing the air bleed vent 48 the suction produced in tube 49 and the lower half of diaphragm chamber 43 by the venturi constriction 50 in the hosecock nozzle causes the small diaphragm 43 to move inwardly against its spring 45 moving rod 42 inwardly and actuating the crank 41 and rod 40, thereby withdrawing the sphere 33 from between the two discs 32 and 34 and thus allowing the small poppet valve 37 to close shutting off the flow in the bleed line between shut-off valve and hosecock and thus closing the main valve.

We claim:
1. A fluid delivery system comprising, in combination:
a pump; a hosecock having a nozzle; a flexible hose connected at its inlet end to the output side of said pump and connected at its outlet end to said hosecock for conducting fluid under pressure from said pump to said hosecock for delivery through the hosecock nozzle; a main shut-off valve placed between and connecting the output side of said pump to the inlet end of said hose; a nonreturn pressure-relief valve situated near the hose end remote from the pump and the main shut-off valve, to prevent leakage; and, switch means contained in said hosecock and linking the hosecock to said main shut-off valve, for operating the main shut-off valve from said hosecock; in which system the said nozzle has a reduced diameter portion providing a constriction; and in which system also the said main shut-off valve comprises a valve body, a main valve member movable in said body from a normally closed position, in which fluid flow from said pump into said hose is prevented, to an open position permitting such flow, diaphragm means in said valve body connected to said main valve member, for opening said main valve member in response to an unbalanced fluid pressure on said diaphragm means, and means for bleeding fluid from said main valve body to establish said unbalanced fluid pressure; and in which system also the said switch means comprises a valve chamber having a first chamber portion communicating with the interior of said nozzle at said constriction, a second chamber portion communicating with said means for bleeding fluid from said main valve body and a normally closed, manually openable, valve in said chamber between said first and second chamber portions, whereby upon manually opening said normally closed valve, fluid will be bled from said main valve body into said constriction through said means for bleeding fluid and through said chamber portions and said main valve member caused to open in response to the unbalanced fluid pressure created in said main valve body.

* * * * *

UNITED STATES PATENT OFFICE
CERTIFICATE OF CORRECTION

Patent No. 3,648,894            Dated March 14, 1972

Inventor(s)     Alan George Morgan

It is certified that error appears in the above-identified patent and that said Letters Patent are hereby corrected as shown below:

| | | |
|---|---|---|
| Col. 2, Line 12, for "start" | read | -- shut -- |
| Col. 2, Lines 16 and 17, for "comprises hosecock nozzle (47) connected to hose (14) and" | read | -- for opening the poppet valve 20 against the action of spring 21 -- |
| Col. 2, Lines 19 and 20, for "for opening the poppet valve 20 against the action of spring 21," | read | -- comprises hosecock nozzle (47) connected to hose (14) and -- |

Signed and sealed this 19th day of September 1972.

(SEAL)
Attest:

EDWARD M. FLETCHER, JR.
Attesting Officer

ROBERT GOTTSCHALK
Commissioner of Patents